(12) United States Patent
Venkataraman et al.

(10) Patent No.: US 6,180,036 B1
(45) Date of Patent: Jan. 30, 2001

(54) METHOD OF MANUFACTURING PRE-INKED THERMOPLASTIC MEDIUM

(75) Inventors: Ravi Venkataraman; Russell Moss, both of Cookeville, TN (US)

(73) Assignee: Identity Group, Inc., Cookeville, TN (US)

( * ) Notice: Under 35 U.S.C. 154(b), the term of this patent shall be extended for 0 days.

(21) Appl. No.: 09/222,207

(22) Filed: Dec. 29, 1998

Related U.S. Application Data

(63) Continuation of application No. 08/990,660, filed on Dec. 15, 1997, now Pat. No. 5,942,312.

(51) Int. Cl.[7] .................................................. B29D 67/00
(52) U.S. Cl. .......................... 264/48; 264/50; 264/46.5; 264/45.8; 264/288.8; 430/300; 430/307; 430/330
(58) Field of Search ................................... 430/944, 202, 430/964, 124, 348, 252, 300, 307, 330; 5/16; 161/465, 467; 264/45.8, 48, 49, 50, 51, 46.5, 46.6, 288.8

(56) References Cited

U.S. PATENT DOCUMENTS

| | | |
|---|---|---|
| 3,742,853 | 7/1973 | Landsman . |
| 3,779,779 | 12/1973 | Landsman . |
| 4,064,205 | 12/1977 | Landsman . |
| 4,725,853 | 2/1988 | Kobayashi et al. . |
| 4,733,249 | 3/1988 | Iwamoto et al. . |
| 5,181,787 | 1/1993 | Hosomi . |
| 5,300,351 | 4/1994 | Takahashi et al. . |
| 5,366,302 | 11/1994 | Masumura et al. . |
| 5,414,450 | 5/1995 | Oshino et al. . |
| 5,554,334 | 9/1996 | Kashio et al. . |
| 5,577,444 | 11/1996 | Toyama . |
| 5,665,524 | * 9/1997 | Kashio et al. . |
| 5,677,721 | 10/1997 | Suzuki et al. . |

FOREIGN PATENT DOCUMENTS 0853004   7/1998   (EP) .

* cited by examiner

*Primary Examiner*—Merrick Dixon
(74) *Attorney, Agent, or Firm*—Reed Smith Shaw & McClay LLP

(57) ABSTRACT

The present invention is directed to a pre-inked thermoplastic foam which is utilized to form a relief image which includes open cells in the area that is designed to transfer ink and enclosed or sealed cells in the area which is designed to be impermeable to ink or other print medium. The present invention also includes the method of using and manufacturing the pre-inked foam.

14 Claims, 1 Drawing Sheet

METHOD OF MANUFACTURING PRE-INKED THERMOPLASTIC MEDIUM

This application claims continuing status under 35 U.S.C. §120 from application Ser. No. 08/990,660, filed Dec. 15, 1997, now U.S. Pat. No. 5,942,312.

FIELD OF THE INVENTION

The present invention relates generally to the field of image plates. More specifically, this invention relates to an image plate formed from a pre-inked thermoplastic medium which is inked prior to processing with an imaging device. Disclosed herein is a pre-inked open-celled thermoplastic material for use with thermal imaging techniques as well as a method of use and manufacture of the pre-inked thermoplastic material.

BACKGROUND OF THE INVENTION

In recent years, the field of manufacturing or producing printing plates such as rubber stamps has experienced rapid advancement, especially in the methods used to fabricate the stamps. Resinous relief printing plates, planographic printing plates, and intaglio printing plates all formed using photosensitive resins now enjoy widespread use. In addition, a number of methods are known for forming printing plates using stencil images. These methods generally involve the use of a thermal printer or a wire dot printer to form a stencil image on a sheet, which is then utilized as a printing plate. These are but a few of the common techniques for forming images on a printing plate or stamp. As disclosed in the related art, the principal areas of stamp manufacturing focus principally on three areas and combinations or modifications thereof which can be classified as molding, etching, and thermal imaging.

In recent years, the art has focused on photosensitive polymers which are selectively exposed to photo rays and harden upon exposure. In a typical manufacturing process utilizing photosensitive polymers, the image to be duplicated on the stamp is prepared or generated using a computer software program, typesetting, or another selected method. The designed image or art is generated using these methods. After the art is camera ready, a photograph is taken and a negative is made. The negative is then placed over a photopolymer plate, after which an ultraviolet light is impinged upon the negative. The ultraviolet light cures the polymer to which it is exposed and any uncured resin is washed away in a washout unit. At this point the photopolymer plate is placed in contact with ink in order to act as a carrier of the ink. It is known that the steps in preparing the artwork in camera ready format, making the negative, and washing away uncured photopolymer, account for more than half the materials and two-thirds of the labor used in manufacturing the stamps. It is also known that these materials are typically thrown away after the particular stamp is made because they are useless for anything but identical stamp preparation. Further, it is known that the process of curing the photopolymer plate using ultraviolet light is both expensive and may have a negative impact on the environment.

Another method involves a complicated process for producing either a metal printing plate or a photosensitive resinous printing plate. In addition, the use of a press machine or heated roller is required for this process. Further, positioning the embossing plate properly on a plate prior to pressing can be challenging to even those highly skilled in the art, and deviation from the proper position can readily occur.

U.S. Pat. No. 5,665,524, which is hereby incorporated herein in its entirety by reference, describes a printing plate which is formed from an open celled thermoplastic medium wherein the open cells are sealed upon exposing to energy rays. The methods described in this reference generally require the use of a negative to block photorays which results in a portion of the photosensitive thermoplastic medium remaining open, unfused or unsealed (these terms refer interchangeably to the fact that thermoplastic foam retains open-cell characteristics) by blocking the energy rays, and a separate portion which is fused or sealed (impermeable to ink) by exposure to the energy rays. The exposed portion forms a background of the image to be formed on the stamp. The background portion prevents the transfer of ink from the thermoplastic foam to the receiving medium, i.e. paper, in these regions. As is common in the related art and as is specifically discussed in this reference, it is not until the image is formed on the sheet that the sheet is exposed to or soaked in ink to absorb the ink which is to be transferred to a print medium. Some of the common reasons associated with inking the plate after the image is formed is to substantially eliminate unwanted effusion or release of the ink. Additionally, adverse conditions may result (i.e., heat dispersion) as a result of heat transfer characteristics of the ink. These and other adverse consequences are recited in U.S. Pat. No. 5,460,757 which is hereby incorporated herein in its entirety by reference. This reference is directed to a gel or colloidal dispersion of uncured or unformed polymer and ink constituents.

SUMMARY OF THE INVENTION

The present invention primarily focuses on the manufacture and use of printing plates comprised of open-celled images on sheets of thermoplastic resins. More specifically, the invention focuses on the use of post-cured or pre-formed thermoplastic resin in the form of sheets, which are then processed via imaging processes known in the art, including thermography and photo flash imaging to form an image of open-cells on a printing plate. In this regard, the related art is deficient in teaching the use of a thermoplastic sheet medium which may be inked prior to forming the images thereon. Although forming a pre-ink stamp is known in the art, the pre-ink material is either in liquid form or gel form. The present invention is directed to a preformed or hardened thermoplastic recording material or thermoplastic sheet which contains an ink constituent at a predetermined concentration to be used in an imaging process whereby open-cells of the thermoplastic medium are heated and sealed in predetermined areas and other areas of open-cells are not heated and left open so that they can transfer an ink constituent contained within the thermoplastic sheet to material to be printed on. When the thermal imaging process is used, selected portions of the thermoplastic medium are heated and sealed, that is, the open cells of the thermoplastic medium are closed, and this results in the formation of a background image or non-image on the thermoplastic medium which is substantially impermeable to the ink constituent and an image portion. When mounted in a hand stamper, the thermoplastic medium effuses ink when pressure is applied.

The present invention provides numerous benefits over the related art. Eliminating the necessity of inking the printing plate after the image is formed reduces the mess normally present when using such ink pads. Additionally, by inking at the optimal saturation levels of the thermoplastic material, the pre-inked thermoplastic material can be used in standard thermal head printers without concern for unwanted effusion of the ink out of the foam during the processing of the thermoplastic material. Also, even minimally pre-inking the thermoplastic material allows for better "wicking" of the ink. This condition improves the capillary action of the thermoplastic material. As a result, if the printing plate or thermoplastic material is more fully inked after the image is formed, the capillary action is much faster and thus the absorption of the ink occurs in a much more timely manner.

These and other features of the invention will be more fully appreciated with reference to the figures and the disclosure to follow:

DETAILED DESCRIPTION OF THE PRESENT INVENTION

Figure 2:
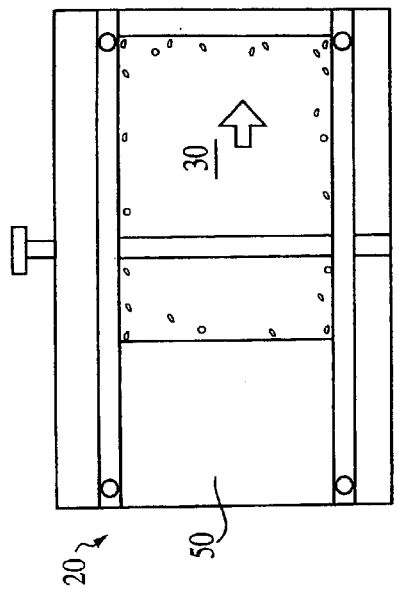
FIG. 2 is a top plate view of the pre-inked thermoplastic medium of the present invention being processed by a thermal head printer.

As used in this disclosure, "thermoplastic recording material" or "thermoplastic medium" means an organic material, normally a polymer, which exhibits plasticity at some stage of manufacture and which can be shaped by application of heat and/or pressure. The "thermoplastic resin" or "thermoplastic medium" preferably includes or is comprised of "open celled" material. The thermoplastic material itself is preferably a polyethylene, and more preferably, an ethylene-olefin copolymer. However, polyurethanes, polyacetals, polystyrenes and polyamides may also be used. The levels of saturation of the thermoplastic medium 30 and the amount of ink constituent held within the thermoplastic medium may vary depending on, among other things, the specific density of the ink constituent 36, the type and density of polymer used, and the degree of porosity in the thermoplastic sheet.

The thermoplastic resin sheet 30 is preferably open-celled. "Open-celled" refers to a continuous cell structure where the cells communicate directly or indirectly with other cells in the thermoplastic resin sheet 30, whereby liquid can pass from cell to cell. "Open-cell" may be used herein to interchangeably refer to the characteristic of the thermoplastic medium 30 and to the fact that the cells 32 of the thermoplastic medium 30 have interstitial spaces which may be filled with an ink constituent. Accordingly, "open-celled" further refers to microporous and porous structures within the thermoplastic medium which are sufficiently sized to store and/or transfer ink and which communicate either directly or indirectly with each other and therefore which may function to transfer ink 36 to the material to be printed on. "Closing", "solidification", "melting", "sealing", "thermalizing" or "hardening" of the surface of the thermoplastic medium are all terms that may be used herein to refer to the substantial elimination of open cells 32 in a specific area which renders that portion of the thermoplastic medium 30 impermeable to an ink constituent. Generally, the thermoplastic medium 30 is a flat sheet having a predetermined length, width, thickness and density.

The surface of the thermoplastic medium 30 is melted and sealed at least at the surface layer, and more preferably, melted at sufficient depth or at a plurality of layers to form the sealed or closed portion 34 as a depressed portion and the open cell image 38 as a relief image. Not sealing the entire space behind the open cells 32 allows the open cells 32 behind the sealed cells to be repositories of printing fluid. The background portion 34 corresponds to the non-image portion of the original image and substantially prevents transfer of printing material 36 through the thermoplastic medium in these areas. The areas of the thermoplastic medium 30 which are not in contact with the heating elements (i.e. laser or modulated thermal energy) are generally formed as a mirror image of the image to be printed on a print material, and as a mirror image of the image viewed on a screen. This results in the proper translation from screen to stamp to paper. The image portion 38 of the printing plate 40 which is to function as an area of ink 36 effusion is comprised of open cells 32. Therefore, when placed in contact with a material to be printed on, an ink constituent 36 or similar material is transferred from the open cells 32 of the image 38 to the paper in the desired pattern. Thus, when the thermoplastic material 30 is mounted as a printing plate 40 in, for instance, a hand stamper, the open cell 32 portions of the thermoplastic medium 30 are able to transfer ink to the material to be printed on, i.e., paper, in those regions 38 which do not contain a layer of sealed cells 34. Conversely, the sealed portions 34 prevent the transfer of ink.

The particular device or procedure utilized to seal the open-cell thermoplastic foam can be any of those known in the art. One type is direct thermal imaging via a thermal head printer 20 as shown in FIG. 2. The thermal imaging prints a background image 34 on the thermoplastic foam 30 by heating with image-wise modulated energy the pre-inked thermoplastic foam 30, preferably, a plurality of layers of the open-cell thermoplastic foam 30. This allows an image 38 to be formed of open cells 32 and a non-image or background 34 to be formed of closed cells. A microprocessor based graphics system may be used to generate the image. A "line" of an image seen on the view screen of the microprocessor normally results in this "line" being formed as a mirror image of the line viewed on the screen, and the mirror image is formed of open cells 32 on the printing plate 40. Similarly those portions of the graphics which are non-images (i.e. white on a black and white monitor) result in the non-image portions 34 being formed of closed or sealed cells.

Figure 4:
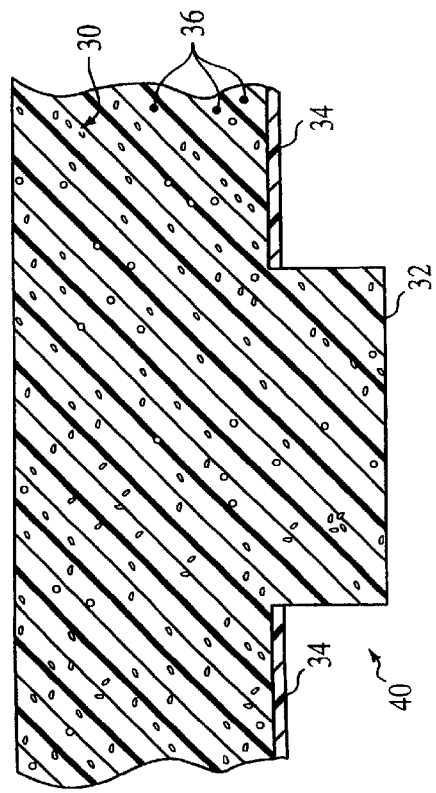
FIG. 4 is a highly enlarged cross section through line 4—4 of FIG. 3 illustrating a letter of the printing plate.

The methods described herein relate to forming a pattern on a pre-inked open-cell thermoplastic foam 30 to printing plate 40 which in general terms is comprised of generating a signal corresponding to the pattern to be formed on the open-cell thermoplastic foam 30, receiving the signal corresponding to the pattern (image 38 and non-image 34) to be formed on the open-cell thermoplastic foam 30, and driving a thermal image device (i.e. laser, thermal print head or photo flash system), to heat the pre-inked open-cell thermoplastic foam 30, thereby sealing at least a layer of open cells 32 in a region which correspond to the background 34 of the entire pattern formed on the open-cell printing plate. Preferably, the printing plate 40 is formed from a sheet of pre-inked thermoplastic foam 30 and the unheated open cell portion 38 is formed as a raised relief image. To accomplish this end, it is more preferable to seal at least a plurality of layers of open cells 32 so that the background portion 34 is formed of at least a plurality of closed cells and depressed, thereby resulting in the image portion 38 being formed as a raised or relief image of open cells. Although the term "layer" as used herein refers to a single layer of open cells, "a plurality of layers" refers to more than just a surface layer of cells. When a plurality of layers are formed, the background portion 34 is not on the same plane as the print surface 42 of image 38. FIG. 4 illustrates this relief concept in a somewhat exaggerated manner.

As used in this disclosure, the term "about" means +/− 10% of a numerical value, i.e. "about 20%" means 18–22%. As used herein, "complete saturation" means complete or maximum absorption of an ink constituent by a thermoplastic recording material.

As used in this disclosure, the terms "energy beam" or "energy ray" as sometimes used hereinafter refer to any ray, beam, radiation or light which is capable of supplying thermal energy to an open-celled sheet, and is preferably selected from ultraviolet rays, infrared rays, visible rays and electron rays. Preferable sources of the energy ray include flash lamps, strobe lamps, laser generators and the like. Of course, a wide variety of rays, beams, radiation, and types of light, together with their associated sources may be employed. The printing plate of the present invention may be obtained either by attaching to the open-celled sheet 30 a mask film capable of selectively intercepting the energy rays and then applying the energy rays over the mask, or may be obtained by direct thermal contact with a thermal head printer, electron beam generator, or laser beam. A pattern of image 38 and non-image 34 areas on the open-celled sheet 30 is then formed by selectively applying the thermal energy rays resulting in printing plate 40.

In order that the invention herein may be described more fully and understood more fully, the following detailed description is set forth.

Figure 1:
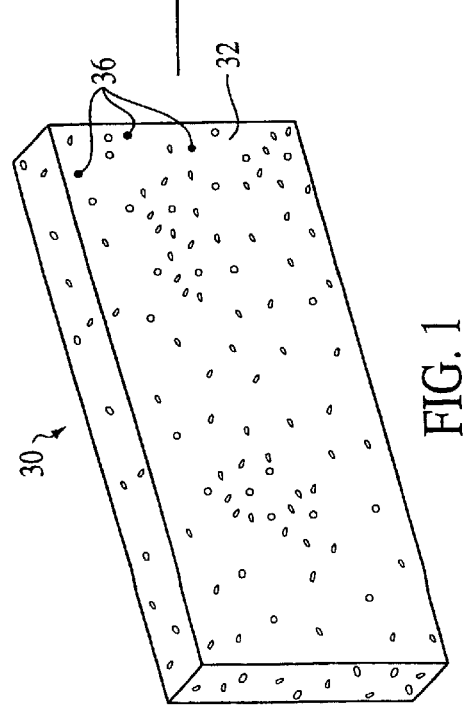
FIG. 1 is an isometric view of a sheet of thermoplastic material which is at least partially saturated with an ink constituent prior to forming an image on the medium.
Figure 3:
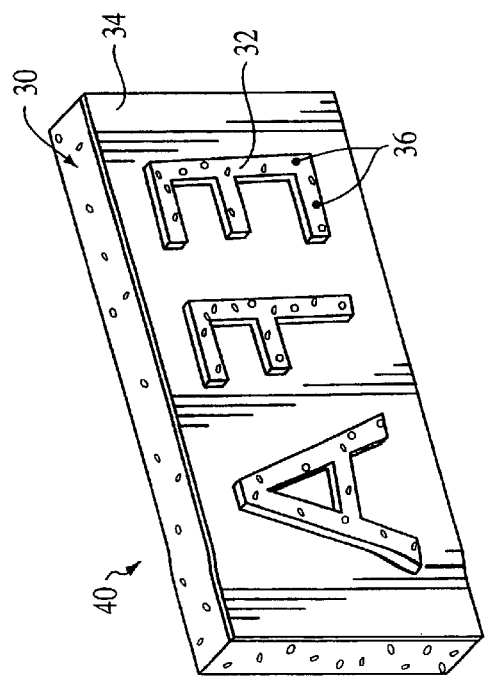
FIG. 3 is an isometric view of the sheet of thermoplastic material which has been processed into a printing plate having a raised open-cell ink effusing face area and a sealed background image.

Thermoplastic medium 30 can be formed from a number of thermoplastic resins, including by way of example, and not limitation, polyethylene, polyolefins, polyacytals, polyurethanes, polystyrene, and polyamide. It has been found that an ethylene-olefin copolymer is particularly suitable for the present invention. It is preferable that the thermoplastic medium 30 be "open celled" prior to the application of heat. In being "open-celled" the thermoplastic medium 30 has interstitial space which may be filled with an ink constituent 36. Many techniques are known for forming open-celled thermoplastic material, including blowing air through the system while the sheet is forming or using a salt-washout technique. The open cells 32 are illustrated in FIGS. 1–4 as large "pores". The thermoplastic medium 30 which has "open cells" 32 is designed to allow an ink constituent 36 to be at least temporarily stored in the thermoplastic medium 30 and transferred to an absorbent material (not shown) at a later time. "Open cell" includes microporous structures which are sufficiently sized to store or transfer ink 36, and cells 32 which are able to communicate directly with other cells 32 or pockets in the thermoplastic foam 30. This allows ink constituent 36 or an emulsified resin to pass from cell 32 to cell 32. The ink constituent 36 is illustrated as black particles for the sake of clarity. Practically any ink constituent may be used with the present invention. For discussion purposes herein, a black ink comprised of 83% 2-ethyl-1, 3-hexandiol, 8.5% solvent black 7 dye, and 8.5% solvent black 5 dye was used. Selection of an appropriate ink constituent 36 and the amount utilized requires analysis of a number of factors. For instance, a type of ink 36 which conducts heat from the area which is to be melted (background portion 34) to the image forming portion 32 is undesirable. As the ink 36 leaves the open cells of the print plate 40, an ink image is formed on ink absorbing paper. When thermal energy is applied to the surface of the thermoplastic foam 30, the surface of the thermoplastic foam 30 melts or solidifies resulting in melted portion 34 of printing plate 40 which eliminates communication between the ink constituent 36 behind the melted portion 34 of the formed print plate 40 and the print medium. Since portion 34 is substantially impermeable to liquid transfer, these areas are suitable in functioning as non-image areas which are not designed to transfer ink 36. Melting or solidifying a portion of the print face 42 of the thermoplastic medium 30 results in a background image 34 of the thermoplastic foam, substantially preventing communication between the underlying open cells 32 containing ink 36 and the paper. Within the thermoplastic foam 30, the ink 36 moves from one cell 32 to the next and may in fact take a very circuitous route to the material to be printed on Referring in particular to FIG. 3 and FIG. 4, the printing plate 40 discussed herein as formed by a thermal imaging process which seals open cells 32 is illustrated. The surface of the thermoplastic foam 30, which is in contact with the energy rays, is melted or solidified resulting in a melting of the open cells 32 of the thermoplastic foam 30 to form a non-image 34 which is impermeable to the transfer of liquid or resin while the image portion 38 (lettering) maintains an open cell 32 structure which permits the transfer of liquid or resin 36 from the printing plate 40 to the material to be printed on. The portions 34 of the thermoplastic foam 30 which are heated and melted are on a lower plane than the open celled image forming portion 38. Thus the image 38 is formed as a relief of open cells (32). As shown in FIG. 1, prior to the desired image being formed on thermoplastic sheet 30, an ink constituent or other suitable ink material is infused into the open cells 32 of the thermoplastic foam 30. Ink can fill the entire open celled structure of the thermoplastic medium 30 except in those melted or solidified surface portion 34 and the ink 36 can be transferred to the paper or print medium except in those areas 34 that are melted and sealed.

As stated above, it is preferable that the ink constituent 36 be absorbed or placed into the thermoplastic foam 30 prior to the formation of the image (sealed non-image portion 34 and open-celled image portion 38) on the printing plate. An image forming process is illustrated in FIG. 2 where the thermoplastic foam 30 is placed on a receiving bed 50 of a thermal head printer 20 and a thermal head (not shown but located below the thermoplastic foam 30) is driven to form the desired image (sealed non-image portion 34 and open-celled image portion 38) on printing plate 40. The image-wise modulated energy is applied directly to the surface of the thermoplastic foam 30. The ink constituent 36 contained within the thermoplastic foam 30 is preferably at a predetermined concentration, whereby the ink constituent 36 does not egress out of the foam 30 without force or pressure being applied to the foam 30. It is preferable that the force exerted on the thermoplastic foam 30 as it is being processed does not cause ink 36 to egress out of the foam 30. This is beneficial in that, when the foam 30 is being processed through, for example, a thermal head printer 20 as shown in FIG. 2, the foam 30 does not release the ink constituent 36 prior to the image being formed thereon. Therefore, it is preferable that the predetermined concentration of the ink constituent 36 be at a lower level than that necessary to completely saturate the thermoplastic recording material 30. The optimal saturation level depends on a number of factors, including, but not limited to, type, density, viscosity, surface tension, etc. of the ink, and type and density of thermoplastic recording material 30. Although specific examples are provided herein, it is to be understood that the present invention is not to be so limited. The thermoplastic medium 30 is preferably pre-inked within the saturation levels for optimum conditions, such as minimal mess (egress of ink 36) on the printer and sharp, clear, clean images being formed on printing plate 40.

The printing plate 40 which is formed in accordance with the present invention is formed by placing a thermoplastic material 30 in sheet form in contact with an ink constituent 36 to thereby form a partially saturated thermoplastic medium 30, wherein the thermoplastic medium 30 is at least partially saturated with ink constituent 36. After the step of placing and soaking the thermoplastic material in an ink constituent 36, thermal energy is applied to selected areas of the partially saturated thermoplastic medium 30 to thereby form a background image 34 on said printing plate 40. In this method, the image 38 is formed of open-cells 32 which are in relief or raised above the surface defined by the background thermalized layer 34. The partially saturated thermoplastic medium is comprised of a thermoplastic foam 30 which is subject to absorbing ink and is saturated less than 100%, preferably in the range of about 50% to about 80%, and even more preferably in the range of about 70% to about 80% saturation with said ink constituent 36. The backside (not shown) of the thermoplastic foam 30 may optionally include a gripping means, such as a sheet of felt (not shown) attached thereto. The felt is useful in processing the thermoplastic foam 30 through the printer (i.e. thermal head printer 20). Using felt as a backing surface allows, for example, a smooth roller to more easily engage the thermoplastic foam 30.

The present invention may also be characterized as a method of forming a pattern (image 38 and non-image 34) on a pre-inked thermoplastic foam 30. The first step normally includes the steps of designing an image to be reproduced by the stamp pad. Normally, the design step is performed on a conventional computer, using any suitable computer software program capable of yielding the selected results. Normally, the imaging data is routed to a controller in much the same way that the information would be communicated to a printer. Thus, the method specifically includes creating an image associated with a set of electronic data, converting the electronic data into a mirror image of said data and forming said mirror image on a surface of the partially saturated thermoplastic material 30. The formation of the image on the partially saturated thermoplastic foam 30 can occur via a number of standard printing processes which close cells on the thermoplastic foam 30 to form background image 34. These include, but are not limited to, photoflash imaging, engraving, laser etching. The following example is set forth to illustrate the preferred ranges of the ink constituent 36 and its correlation to a select thermoplastic material 30. The examples provided are meant for purposes of illustration and clarification only and are not meant to limit the breadth of the claimed invention in any way.

EXAMPLE

A thermoplastic medium 30 comprised of an ethylene-olefin copolymer was used in the following example. The density of the thermoplastic medium 30 was 4.1 grams/inch$^3$. Typically, the density of the un-inked thermoplastic material is in the range of about 2 to about 6 grams/inch$^3$, and more preferably, in the range of about 4 to about 5 grams/inch$^3$. In this example, the thermoplastic medium 30 had a length of 6.187 inches, a width of 4.187 inches and a thickness of 0.280 inches. The weight of the dry un-inked pad was approximately 30 grams. Complete or 100% saturation of the thermoplastic medium 30 is undesirable because applying very little force results in unwanted effusion of the ink from the thermoplastic material 30. This is especially relevant regarding the use on the thermal head printer 20 of FIG. 2, where the slightest force (i.e., by a roller) would result in unwanted effusion of the ink. It has been found that less than complete saturation is much more desirable. 100% saturation is a value which can be calculated based upon the void volume of the thermoplastic material 30. In this specific example, 100% saturation based upon the expected void volume would be approximately 129 grams by weight. However, the maximal obtainable saturation of the thermoplastic foam 30 is in the range of 80–95%, more specifically about 81% saturation (about 105 grams). For use with thermal head printers, it has been found that saturation levels under 80% are most effective, with preferable saturation levels between about 50% to about 80%, and more preferably, in the range of about 72% to about 76%. Early indications from use of photoflash imaging of the pre-inked foam 30 is that the optimal saturation levels are lower for flash than for thermal head printing. The preferable saturation for flash imaging being in the range of 50% to about 75% and more preferably in the range of about 65% to about 70% saturation. When the saturation levels are less than those maximally obtainable (as is the case in the preferred embodiment), it has been found to be preferable to saturate the thermoplastic medium 30 first to the maximally obtainable values, and then displace ink to lower the level to the desired level. This results in more even distribution of the ink 36 in the thermoplastic foam 30. Although optimal ranges have not been fully studied for laser formation of an image on a thermoplastic medium 30, the use of pre-inked foam with laser formation of the image has been shown to be successful.

Although not meant to be bound by theory, it is speculated that during the image forming process (i.e., thermal head printing, photoflash imaging and laser imaging) when the open cells are collapsing to form non-permeable background portion 34, the ink constituent is functioning as a lubricant and as a means to transfer heat. If too much ink is present (i.e., the saturation levels for thermal head printing exceed 80%), the cellular layers do not adequately seal. It should be noted, however, that a very minimal amount of ink, that is nearly 0.01%, may provide the advantageous lubricating and heat transfer qualities of the present invention, and additional ink 36 may be added after the image (background 34—image 36) are formed. Pre-inking with even a minimal amount of ink 36 is advantageous over the related art because even though inking after image formation is necessary, the capillary action or absorption of the printing plate 40 is more rapid than absorption with a dry ink pad. Therefore, although it is preferable to avoid the necessity of inking the printing plate 40 after image formation altogether (as does the preferred embodiment of the present invention), it is to be recognized that even partially saturating the thermoplastic foam 30, even at minimal levels, provides advantages over the related art.

The present invention is also directed to a method of forming a pattern on a printing plate 40 wherein the pattern consists of an open-celled portion 32 filled with ink constituent 36 and closed or sealed portion 34. A signal which corresponds to the pattern to be formed on the printing plate 40 is normally generated with a computer graphic program or other microprocessor system which sends information to a driver circuit which in turn communicates with the print device. Once the signal is received, the corresponding pattern (image 38 and background image 34) is formed on the printing plate 40. It is preferable that the open-cell image portion 38 is formed as a relief pattern and therefore does not exist on the same plane as the melted portion or closed cells 34 which form the background image on the printing plate 40.

Although the invention has been described in terms of particular embodiments in an application, one of ordinary skill in the art, in light of this teaching, can generate additional embodiments and modifications without departing from the spirit of, or exceeding the scope of, the claimed invention. Accordingly it is to be understood that the drawings and the descriptions herein are proffered by way of example only to facilitate comprehension of the invention and should not be construed to limit the scope thereof.

What is claimed is:

1. A method of forming a printing plate comprising of:

placing an open-celled thermoplastic material in contact with an ink constituent thereby forming a partially saturated open-celled thermoplastic medium; and sealing selective areas of said partially saturated open-celled thermoplastic medium to thereby form a background image on said printing plate.

2. The method of claim 1, wherein a relief image is formed of open-cells capable of transferring said ink constituent to a material to be printed on.

3. The method of claim 2, wherein the ink constituent is at less than 100% theoretical saturation of said thermoplastic material.

4. The method of claim 3, wherein the ink constituent is at about 60% to about 80% saturation.

5. The method of claim 4, wherein the ink constituent is at about 72% to about 76% saturation.

6. The method of claim 1, wherein said open-celled thermoplastic material is comprised of polyethylene.

7. The method of claim 6, wherein said open-celled thermoplastic material further includes a polyolefin.

8. A method of manufacturing a pre-inked stamp comprising the steps of:

contacting an open-celled thermoplastic medium with an ink constituent to form a partially saturated thermoplastic material;

creating an image associated with a set of electronic data;

converting said electronic data into a mirror image of said image;

forming said mirror image of said image on a print surface of said partially saturated thermoplastic material.

9. The method of claim 8, wherein said step of forming said mirror image of said image on said print surface of said partially saturated thermoplastic material includes exposing said thermoplastic material to thermal energy.

10. The method of claim 9, wherein said thermal energy is provided by a thermal head printer.

11. The method of claim 9, wherein said thermal energy is provided by energy rays.

12. The method of claim 8, further including the step of inking the pre-inked stamp after the image is formed on the print surface.

13. The method of claim 8, wherein said thermoplastic material is comprised of a polyethylene.

14. The method of claim 13, wherein said thermoplastic material includes a polyolefin.

* * * * *